Patented Jan. 26, 1954

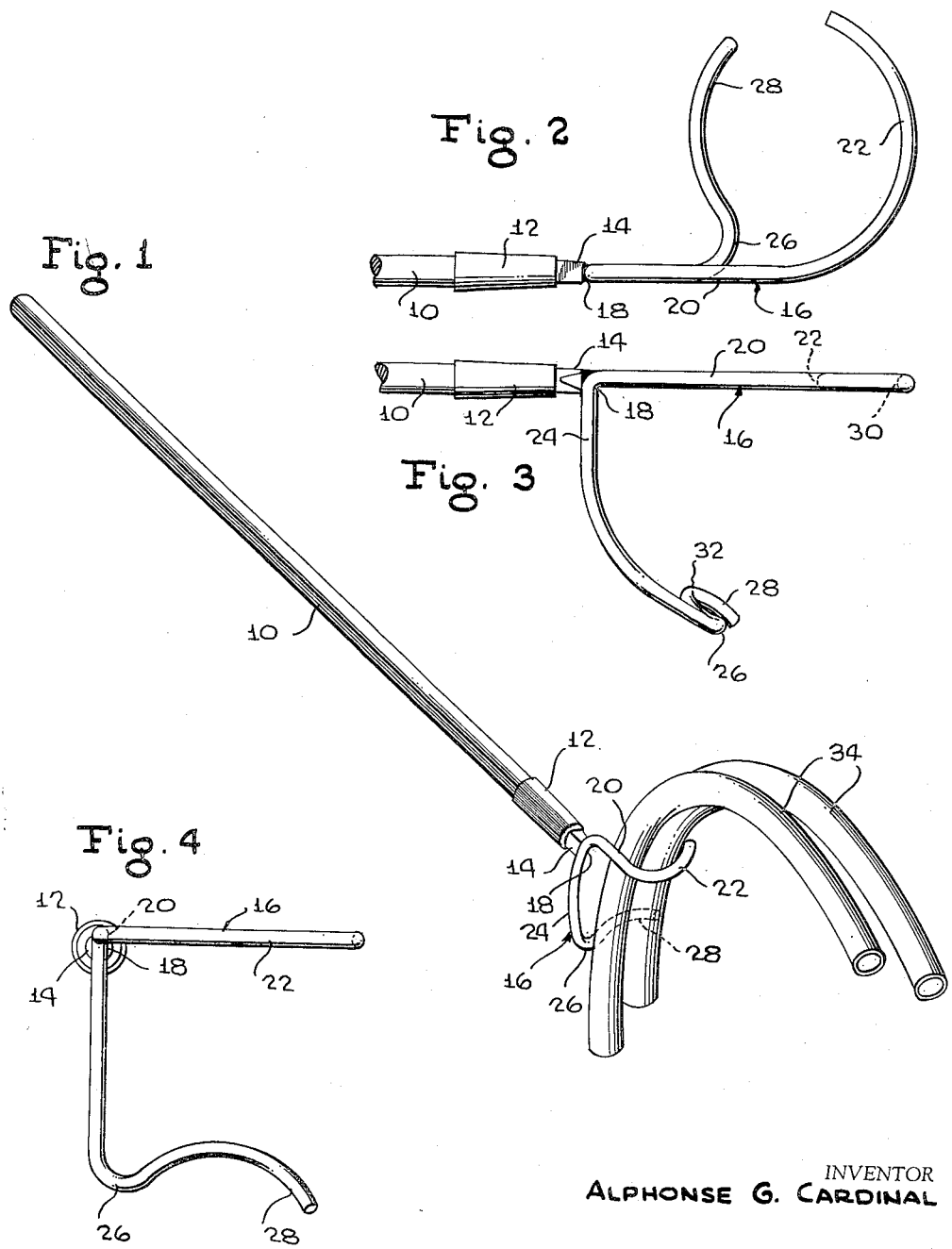

2,667,375

UNITED STATES PATENT OFFICE 2,667,375

IRRIGATION TUBE LIFTER

Alphonse G. Cardinal, Floydada, Tex.

Application September 7, 1951, Serial No. 245,621

1 Claim. (Cl. 294—19)

This invention relates to a device for lifting siphon tubes from irrigation ditches.

In one method of crop irrigation, the irrigation ditches are so arranged that each will extend along a particular ground area, called a "row." Each row, in this connection, is irrigated by positioning a number of siphon tubes longitudinally of the ditch adjacent thereto. Said tubes are generally rigid or semi-rigid, are formed open at both ends, and are crescent-shaped, so as to extend over the bank of the ditch.

The ditches are often a half-mile in length, with feed rows along one side thereof. The tubes used to water a row comprise a "set," and it is common for a set to include forty or more tubes. When a set of tubes is to be moved from one ditch to another, it is necessary that all the tubes of the set be picked up for transportation to the next row. When a set is properly positioned relative to a ditch, a plastic dam is placed in the ditch to raise the level of the water and hence increase the capacity of the ditch for irrigation of the adjacent row. This promotes starting of siphon action and additionally permits use of a very long ditch along which the set will extend a considerable distance.

After a particular row has been irrigated, it is necessary that all the siphon tubes be removed and carried to the next adjacent ditch for irrigation of another row.

Conventionally, the several siphon tubes are lifted by hand for transportation to the next ditch. This is not only time-consuming, but also requires that the person charged with the task of assembling the tubes walk through the heavy mud on the irrigated side of the ditch, since it is not possible under ordinary circumstances to reach the tubes from the dry side of the ditch.

Accordingly, it is the main object of the present invention to provide a tool or implement particularly designed for lifting irrigation siphon tubes of the type stated for transportation to the next ditch with the tool being operated from the dry side of the ditch.

Another important object is to provide a tool of the type stated which will be of highly simplified construction, and will have no moving parts.

Yet another object is to provide an irrigation siphon tube lifter which is so formed as to be adapted for lifting either one or two tubes, as desired.

Yet another object is to provide a lifter as described which can be manufactured at minimum cost, and will be rugged and durable so as to be capable of use over a long period of time.

Other objects will appear from the following description, the claim appended thereto, and from the annexed drawing, in which like reference characters designate like parts throughout the several views, and wherein:

Figure 1 is a perspective view of a tube lifter formed in accordance with the present invention, as it appears when in use during the lifting of a pair of irrigation tubes;

Figure 2 is an enlarged top plan view of the lifter, a portion of the handle being broken away;

Figure 3 is a side elevational view; and

Figure 4 is an end elevational view of the lifter as viewed from the right of Figure 3.

Referring to the drawings in detail, a tube lifter formed in accordance with the present invention includes an elongated handle 10. Desirably, the handle 10 is proportioned to a sufficient length as to permit one standing on the dry side of an irrigation ditch to reach over the ditch with the handle for the purpose of lifting siphon tubes extending over the bank at the opposite side of the ditch.

At its head end the handle 10 is fitted with a tapered metal ferrule 12 rigid with a stud 14 disposed axially of handle 10 and projecting a short distance beyond the head end of the handle.

The tool includes a lifting head, generally designated 16, said head being formed from a single length of rod material that is bent to a particular shape to be described hereinafter.

The intermediate portion 18 of the length of rod material is fixedly secured, in any suitable manner, to the free end of the stud 14.

The lifting head of the device comprises top and bottom loop members extending in opposite directions from the inner portion 18 of the length of rod material used in forming the head of the device. The top loop member includes a straight arm 20 projecting forwardly from the handle 10 and aligned substantially coaxially therewith.

At its outer or forwardly projecting end, the arm 20 merges into an open loop or hook 22 of arcuate or crescent-shaped formation, the loop 22 extending laterally of the handle and curving rearwardly at its free end in the general direction of the handle.

The bottom loop member includes an arm 24 extending from the intermediate portion 18, said arm 24 being disposed wholly in a plane related perpendicularly to the common plane in which the arm 20 and loop 22 lie. The arm 24, however, is not straight from end to end thereof, and as may be noticed in Figure 3, the outer end of the arm curves forwardly from the handle 10 and merges into a bottom loop that also extends laterally of the handle in the same direction as that in which the top loop is extended, as best seen from Figure 4. In forming the bottom loop, I provide a reverse bend 26 at the outer end of the arm 24, said reverse bend merging into a loop 28 curved oppositely to the loop 22 (Figure 2), so as to curve toward its free end in a direction away from the handle 10.

It is to be noted that the intermediate or tube-engaging part of the top loop 22, designated 30 in Figure 3, and the intermediate or tube-engaging part 32 of the bottom loop 28 are arranged in a line offset laterally of and disposed obliquely to the longitudinal axis of the handle 10, the intermediate part 32 being disposed substantially more closely to the front end of the handle than is the intermediate part 30 of the upper loop. Additionally, the lower loop lies in a plane oblique to that of the upper loop and intersecting with said plane of the upper loop substantially at the point of fixed connection of the lifting head to the handle.

In Figure 1 the implement is illustrated as it appears when in use during the lifting of a pair of crescent-shaped relatively rigid siphon tubes 34. In using the tube lifter, the worker remains on the dry side of the irrigation ditch, and extends the device across the ditch, so as to engage the top loop 22 under one or more irrigation siphon tubes 34. The top loop 22 is positioned in engagement with the tube or tubes 34 at a location fairly close to that end of the siphon tube that is disposed within the water of the irrigation ditch.

In engaging the loop 22 under the tube 34, the user of the device manipulates the head thereof so as to position the bottom loop 28 over the tubes in the manner shown in Figure 1. Due to the relative arrangement of the loop and bottom loops, the bottom loop will be engaged with the tube 34 at a location between the top loop 22 and said end of the tube.

Since the major portion of the tube will be disposed between the top loop 22 and the end of the tube seen at the right in Figure 1, the tube will be overbalanced, and by reason of its own weight, will engage the respective loops 22, 28 in a manner to cause the siphon tube to be firmly supported by the lifting head of the device. Thereafter, the user simply lifts the siphon tube from place and carries it to the dry side of the ditch.

It will be noted that the particular disposition of the top and bottom loops, shown to particular advantage in Figure 3, and described hereinbefore, is effective to permit the siphon tubes to be readily engaged with the lifting head of the device, and furthermore, acts to cooperate with the weight of the tube in such a way as to cause the tube to be firmly engaged by the loops.

It is believed clear that the invention is not necessarily confined to the specific use or uses thereof described above, since it may be utilized for any purpose to which it may be suited. Nor is the invention necessarily limited to the specific construction illustrated and described, since such construction is only intended to be illustrative of the principles of operation, and the means presently devised to carry out said principles, it being considered that the invention comprehends any minor changes in construction that may be permitted within the scope of the appended claim.

What is claimed is:

An irrigation siphon tube lifter comprising a handle; and a lifting head projecting beyond one end thereof formed from a single length of rod material having a fixed connection intermediate its ends to said end of the handle, said length of material being shaped to provide spaced upper and lower loop members extending from said fixed connection, the upper loop member including an upper arm extending forwardly from and substantially coaxially aligned with the handle and an upper loop extended laterally of the handle from that end of the arm remote from the handle and curved rearwardly in the general direction of the handle, the lower loop member including a lower arm extending from said fixed connection in substantially perpendicular relationship to the upper arm, and a lower loop curved oppositely to the upper loop and extending laterally from that end of the lower arm remote from the handle in the same direction as that in which the upper loop is extended, the upper loop being spaced a greater distance from said end of the handle than the lower loop, said loops having intermediate portions respectively shaped to engage under and over a siphon tube at locations spaced longitudinally of the tube, the intermediate portions of the loops being disposed in a line oblique to the longitudinal axis of the handle for overbalancing of one end portion of the tube to force the opposite end portions thereof against the respective loops.

ALPHONSE G. CARDINAL.

References Cited in the file of this patent

UNITED STATES PATENTS

| Number | Name | Date |
|--------|------|------|
| 916,858 | Geisking | Nov. 30, 1909 |

FOREIGN PATENTS

| Number | Country | Date |
|--------|---------|------|
| 334,022 | Germany | June 13, 1919 |